L. RODENHAUSEN.
DUMPING WAGON.
APPLICATION FILED MAR. 18, 1916.
1,289,548.
Patented Dec. 31, 1918.
6 SHEETS—SHEET 5.
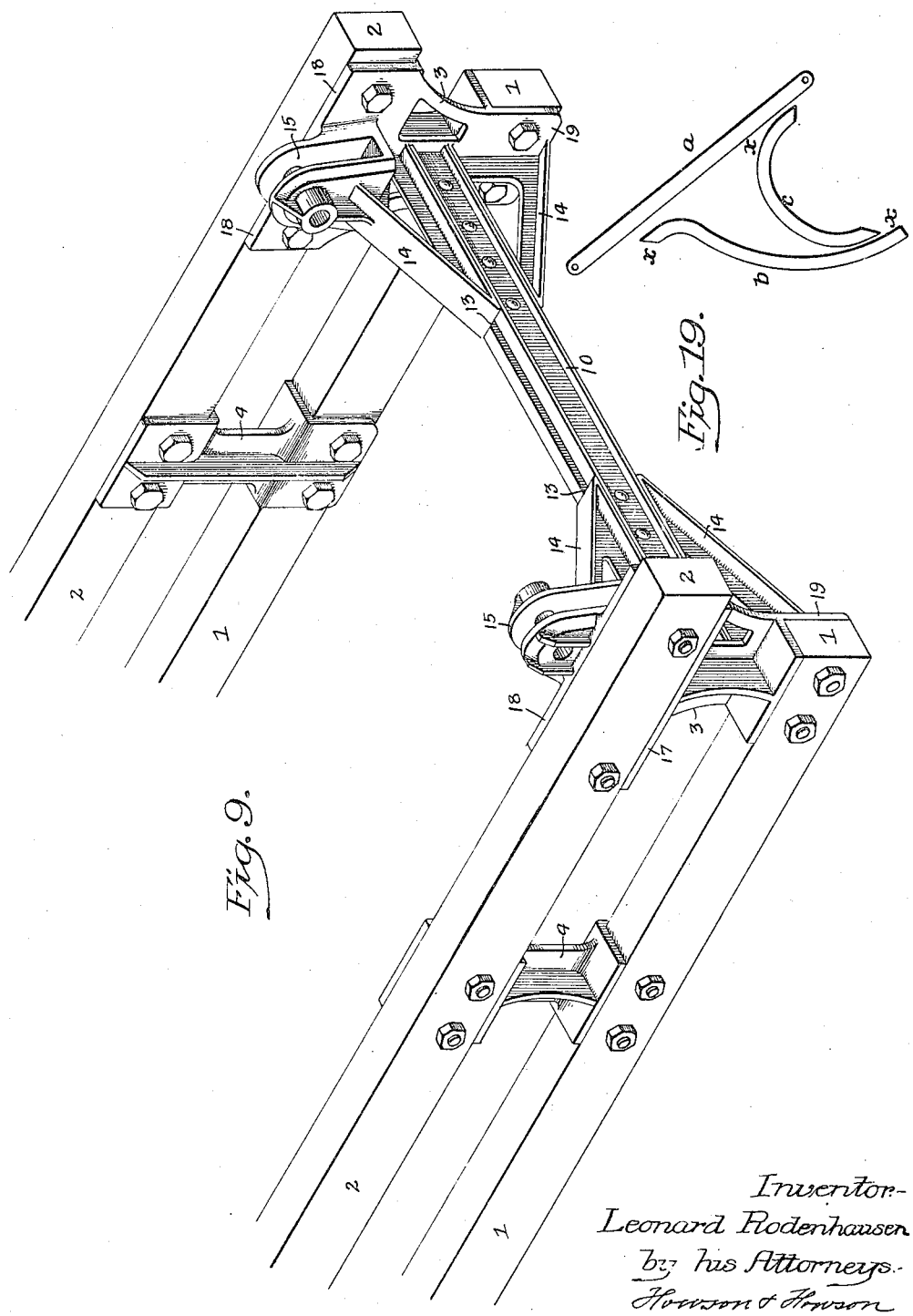
Inventor-
Leonard Rodenhausen
by his Attorneys
Howson & Howson

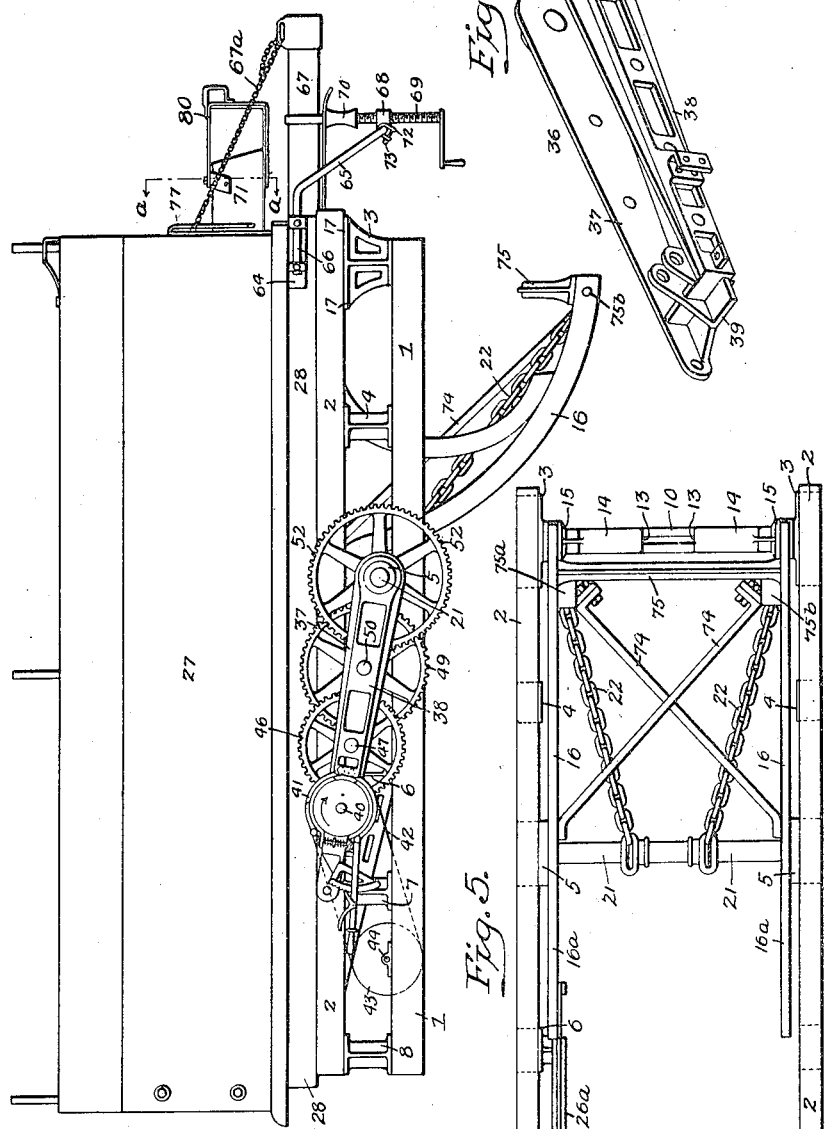

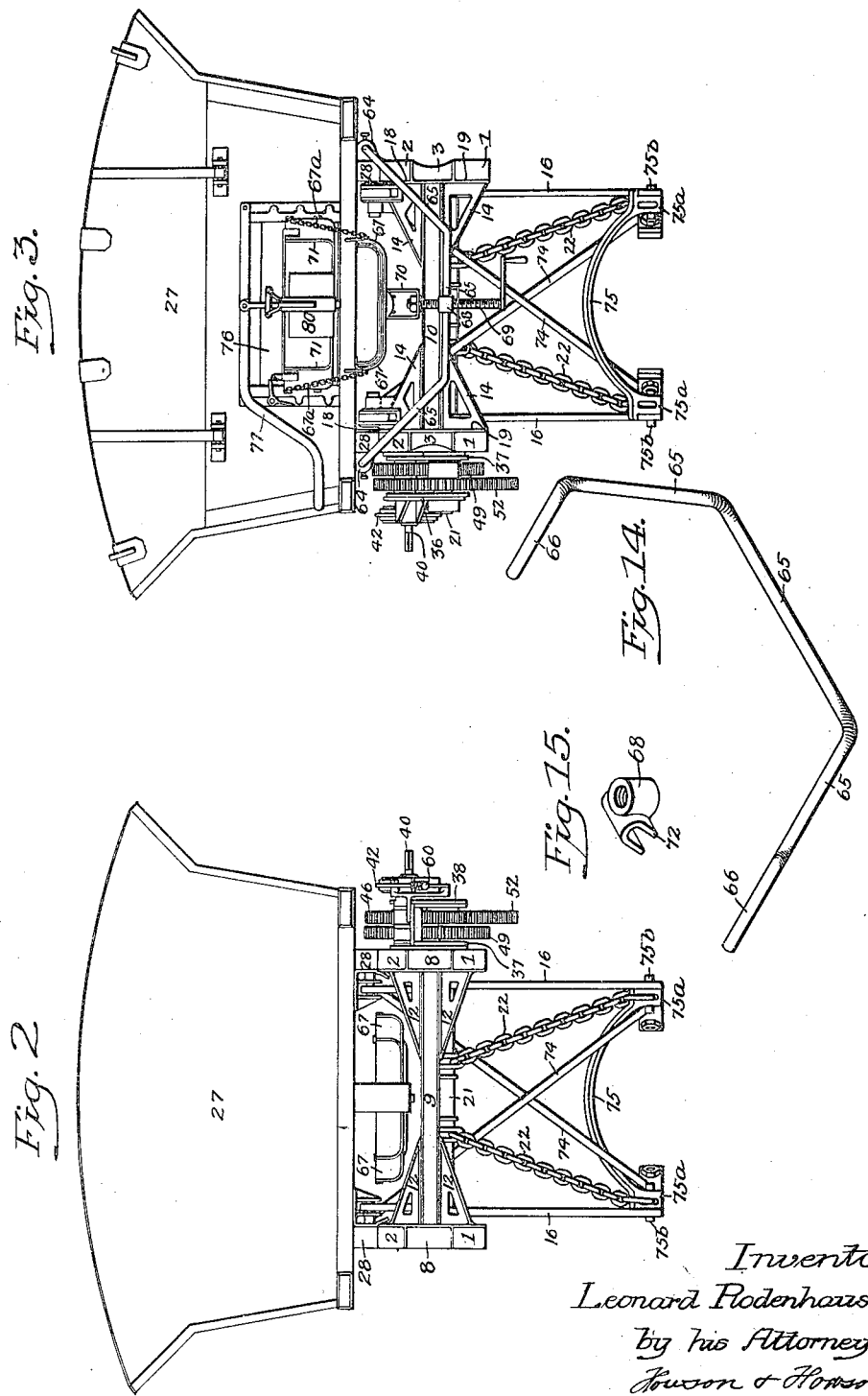

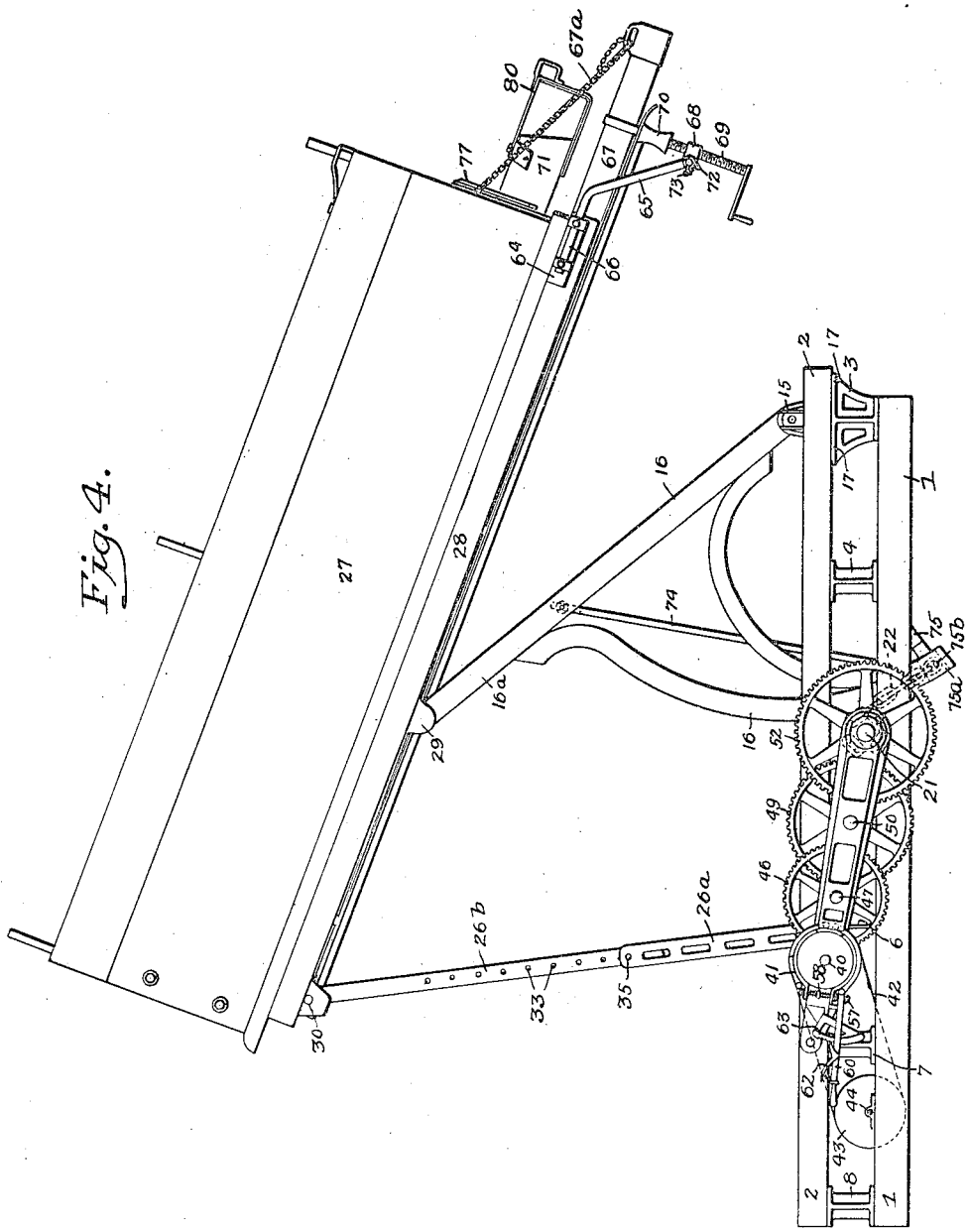

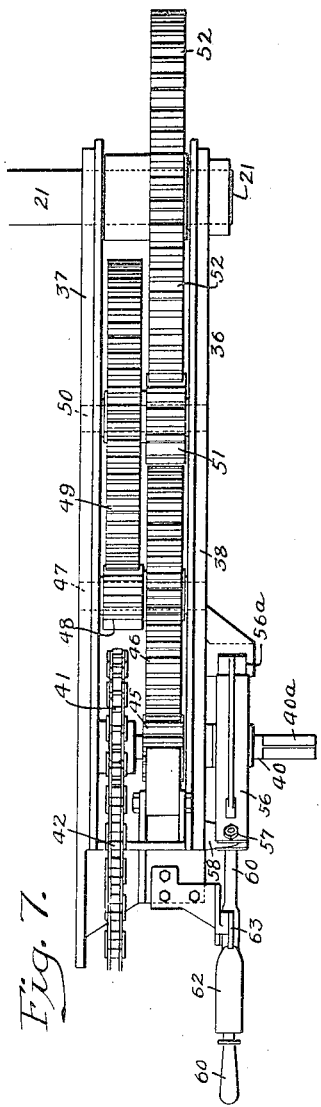
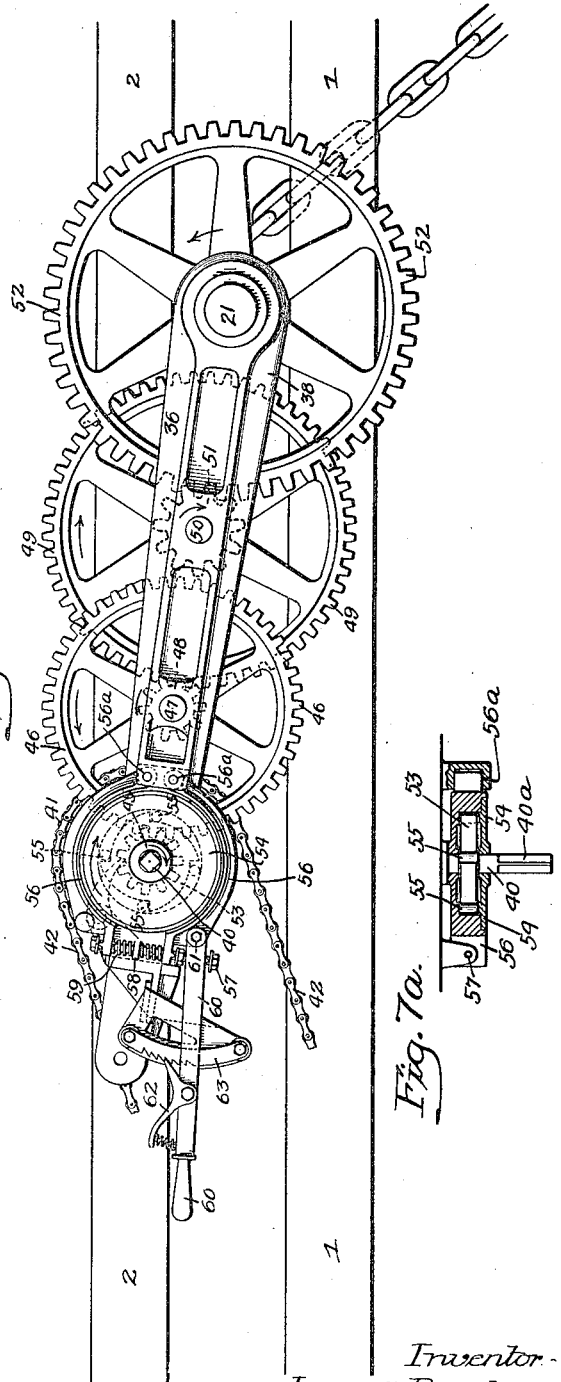

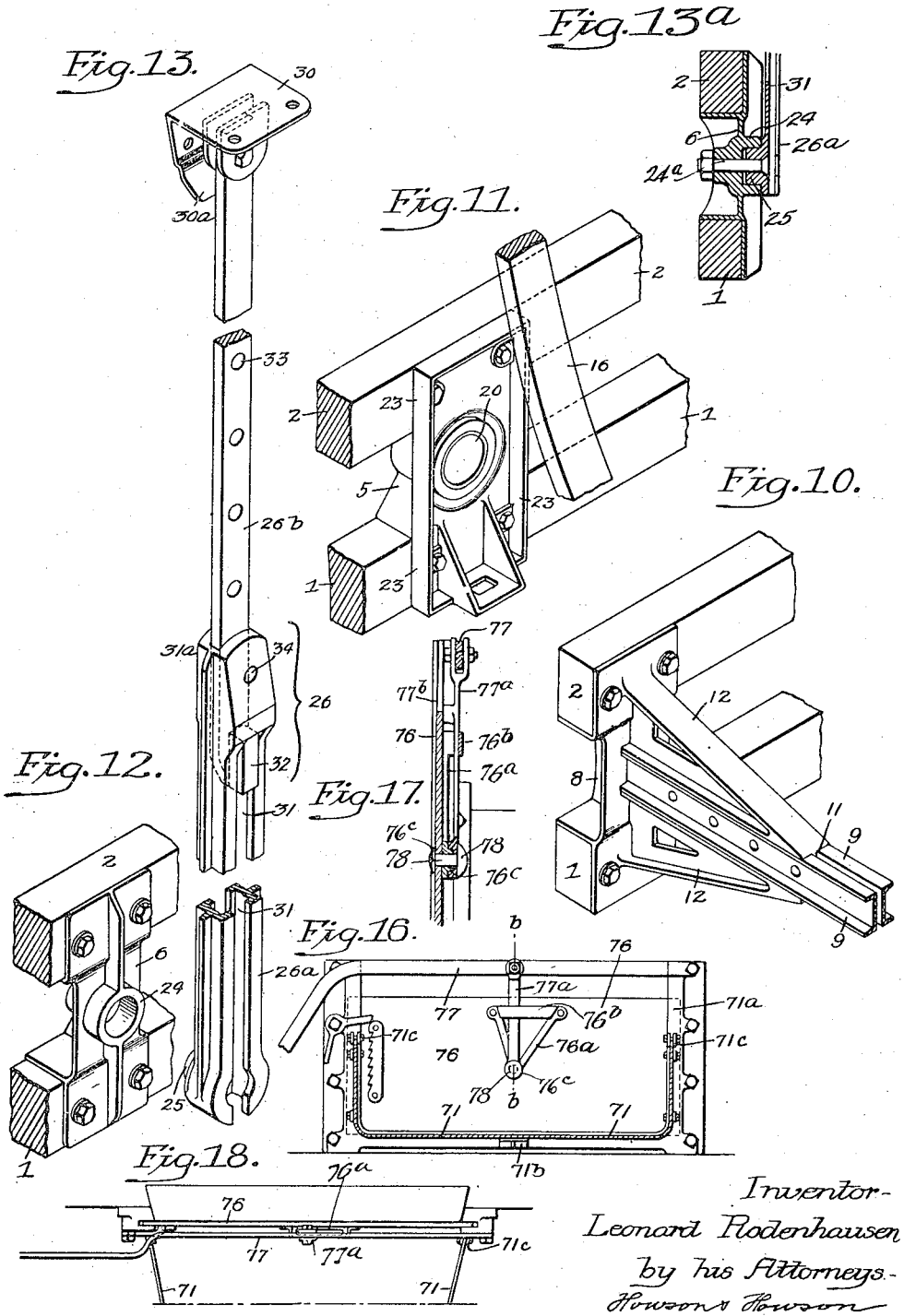

UNITED STATES PATENT OFFICE.

LEONARD RODENHAUSEN, OF PHILADELPHIA, PENNSYLVANIA.

DUMPING-WAGON.

1,289,548.  Specification of Letters Patent. Patented Dec. 31, 1918.

Application filed March 18, 1916. Serial No. 85,083.

*To all whom it may concern:*

Be it known that I, LEONARD RODENHAUSEN, a citizen of the United States, residing in Philadelphia, Pennsylvania, have invented certain Improvements in Dumping-Wagons, of which the following is a specification.

This invention relates to certain improvements in that type of dumping wagon in which the superstructure is carried by a fixed frame mounted on the running gear of the wagon and in which the body is raised and tilted so as to discharge the contents from one end of the wagon. A wagon of this type is especially adapted for carrying coal and similar material.

The object of the invention is to make a wagon of this type more substantial than heretofore and to provide rigid connections for the parts and also to provide a frame for the gearing which will be substantial and can be assembled prior to its application to the wagon. The invention also relates to certain details, which will be fully described hereinafter.

In the accompanying drawings:

Figure 1 is a side view of the wagon structure showing the body portion in its normal position, the wheels and running gear having been omitted;

Fig. 2 is a front elevation;

Fig. 3 is a rear elevation;

Fig. 4 is a side view, similar to Fig. 1, with the body raised and tilted;

Fig. 5 is a plan view of the frame that carries the body portion;

Fig. 6 is an enlarged side view of a portion of the gearing by which the body is raised;

Fig. 7 is a plan view of the mechanism illustrated in Fig. 6;

Fig. 7ª is a sectional view of the clutch shown in Fig. 6;

Fig. 8 is a perspective view of the gear carrying frame;

Fig. 9 is a perspective view of the rear portion of the main frame, showing the sills and transverse braces and also showing the spacing members;

Fig. 10 is a perspective view of a portion illustrating the front ends of the sills and the transverse brace;

Fig. 11 is a sectional perspective view illustrating the bearing for the winding shaft;

Fig. 12 is a sectional perspective view illustrating the bearing for the telescopic bar;

Fig. 13 is a perspective view of the telescopic bar;

Fig. 13ª is a view showing the bar pivoted to its bearing;

Fig. 14 is a perspective view of the rear support for the chute;

Fig. 15 is a perspective view of the nut in which the chute screw shaft is mounted;

Fig. 16 is a sectional view of the spout on the line $a$—$a$, Fig. 1;

Fig. 17 is a sectional view on the line $b$—$b$, Fig. 16;

Fig. 18 is a plan view of the spout shown in Fig. 16; and

Fig. 19 is a view showing the elements of the quadrant detached.

1, 1 are the two lower sills of the frame, which are mounted on the running gear. The running gear may be either for a horse drawn vehicle or for an automobile truck. 2, 2 are the upper sills of the frame spaced from the lower beams and rigidly connected thereto by the standards 3, 4, 5, 6, 7, and 8. The sills are preferably made of wood and the standards are of metal and are rigidly secured to the sills by bolts. The standards 4 and 7 are made as shown in Fig. 9, and have upper and lower portions and each portion has a vertical flange at one side. The lower portion of these standards rests on the lower sill 1 and the flange is secured thereto by bolts. The sill 2 rests on the standards and the upper flange extends on the inner side of the beam and is secured thereto by bolts. The two side frames are connected together at the forward end by a cross brace 9 and at the rear end by a cross brace 10. The cross brace 9 is composed of two channel beams, which are located on each side of a web 11, which projects inwardly from the standard 8, the sills being secured thereto by rivets or bolts, as shown in Fig. 10. This web is reinforced by diagonal braces 12 made integral with the standard 8 and the web 11. The cross brace 10 also consists of two channel beams placed back to back and secured to webs 13 projecting inwardly from the two standards 3. Rivets or bolts may be used to fasten these parts together. Diagonal braces 14 of a similar type to those of the front end of the body are used to stiffen these cross braces. Bearings are located in the upper end 15 of the standards 3 for the pivoted quadrant 16. It will be noticed that the rear standards 3 have extended flanges 17 which support the rear end of the sills and have upper flanges 18 which rest against the side of the upper sills and lower flanges 19 which rest against the side of the lower sills so that, when the parts are secured by bolts, as shown in Fig. 9, the structure is exceedingly rigid. This is essential, as it will be understood that this rear structure is subjected to considerable strains when the body portion is loaded and raised, as shown in Fig. 4.

Each standard 5, illustrated in Fig. 11, has the bearing 20 for the shaft 21 on which the hoisting chain 22 is wound when it is desired to raise the body portion, and has a flange 23 which forms a wear strip and guide for the quadrants 16; this flange also strengthens the standard.

The standard 6 has a bearing 24 for the pivot 25 of the telescopic bar 26 and is suitably braced to properly support this bar when the body is elevated, as shown in Fig. 4; this bar is held to its bearing by a bolt 24$^a$, Fig. 13$^a$. The body portion 27 may be of any design desired and is provided with side sills 28 which rest upon the upper sills 2 of the frame when in the lowered position, as in Fig. 1, and has a bearing 29 for the upper end 16$^a$ of the quadrant 16 and also has a bearing 30 for the telescopic rod 26. This bearing is clearly shown in Fig. 13 and has a guide flange 30$^a$ which guides the body as it comes to rest on the frame.

The telescopic rod is made in two parts. The lower portion 26$^a$ is preferably a malleable iron casting and has a slot 31 therein shaped, as clearly shown in Fig. 13, to receive the end of the section 26$^b$ which has a block 32 which projects through the slot and acts not only as a stop against the closed end 31$^a$, but also as an additional guide for the parts. The section 26$^b$ has a series of holes 33 therein, any one of which can be brought into line with the hole 34 in the upper end of the section 26 and a pin 35 is inserted through the holes so as to hold the two parts in fixed relation to each other. Ordinarily, a single brace is all that is necessary, but there may be a brace located on each side of the wagon, if desired.

On one side of the frame is a bearing 36 made as clearly shown in Fig. 8, having two longitudinal sections 37 and 38, the section 37 being bolted securely to the frame and the section 38 overhanging and connected to the section 37 by a cross member 39 at the rear. 40 is a main driving shaft which may be turned by hand, if desired.

If the mechanism is mounted on a power driven truck, then the shaft 40 is provided with a sprocket wheel 41 around which passes a chain 42 from a sprocket wheel 43 on the power shaft 44. The outer end of the shaft 40 is squared, as at 40$^a$, to receive a handle by which the shaft can be turned by hand. On the shaft 40 is a pinion 45 which meshes with a gear wheel 46 on a shaft 47 adapted to bearings on the frame 36 and on this shaft is a pinion 48 which meshes with a gear wheel 49 mounted on a shaft 50 adapted to bearings in the frame 36 and on the shaft 50 is a pinion 51 which meshes with a gear wheel 52 on the chain shaft 21, also having its bearings in the frame 36. The gear wheel 52 extends beyond the frame and motion imparted to the shaft 40 will be transmitted to the shaft 21 through the train of gears above mentioned. As the shaft 21 is connected to the quadrants through the chains 22 it will raise the quadrants and will lift the body portion to the position illustrated in Fig. 4, or to any intermediate position desired.

I provide the shaft 40 with a brake by which the movement of the parts can be controlled. Secured to the shaft 40 is the hub section 53 of a roller clutch which is located in a chamber formed in the drum 54, Fig. 7$^a$. Rollers 55 are located in the space formed by the cam-shaped projections on the hub section so that when the shaft is turned in the direction of the arrow, Fig. 6, the shaft and hub section will turn free of the drum and when the shaft is turned in the opposite direction the rollers will bind in the space between the drum and the hub. The drum can be held, when desired, by the brake shoes 56 pivoted at 56$^a$ to the frame 36 and these brake shoes are connected at the opposite end by a bolt 57 which passes through a projection 58 on the frame and on each side of this lug are springs 59 which tend to separate the brake shoes so as to release the drum 54. The lower end of the bolt 57 is engaged by a lever 60 pivoted at 61 to one of the jaws and connected to the other jaw through the bolt 57 so that when the lever 60 is moved it can either apply the brake shoes or release them. A latch 62 on the lever engages a toothed segment 63 secured to the frame 36, as clearly shown in Figs. 6 and 7, so that the brake shoes can be locked in position.

When it is desired to lift the body portion, the power driving mechanism is thrown into gear with the main engine shaft of the truck and then by applying the engine clutch the engine shaft drives the first shaft of the train through the sprocket wheel and the hub of the clutch turns in the direction of the arrow and the rollers run free. The moment, however, that the engine clutch is released the rollers engage the ring which is locked to the frame by the hand lever and the body remains in the elevated position to which it has been raised. When the material is discharged from the wagon, the body portion can be allowed to drop by shifting the lever 60 and releasing the clutch drum so that the drum will turn in the reverse direction with the clutch hub, due to the contact of the rollers.

At each side and near the rear end of the body portion are bearings 64 in which are mounted the ends 66 of the bar 65, which is bent, as clearly shown in Fig. 14. This bar supports the chute 67 and mounted on the bar is a nut 68 for the screw shaft 69 which is adapted to a frame 70 secured to the inner section of the chute 67 so that when the chute is projected the handled screw 69 can be turned to raise the chute directly under the spout 71 at the rear end of the body portion 27. The nut 68 is made as clearly shown in Fig. 15 having a threaded portion through which the screw shaft extends and a U-shaped portion 72 which extends over the cross bar 65. The nut 68 is held to the cross bar by a cotter pin 73 so that when it is desired to remove the nut from the cross bar, all that is necessary is to withdraw the pin and to detach the nut with the screw shaft 69 and the entire chute can be removed. The chute, in the present instance, is made in two sections, but it will be understood that it can be made in as many sections as desired, and can be formed in any manner, depending upon the style of wagon to which it is to be applied. In some instances, where a chute is not desired, it can be omitted, together with the cross bar 65 and its connections.

There is a quadrant at each side of the wagon and the two quadrants are connected together at their outer ends by a malleable iron casting 75, which is arched to clear the other mechanism of the wagon and in each of these castings is a socket 75$^a$ for the end of the chain and a transverse pin 75$^b$ is passed through the socket and through an opening in one of the links of the chain, making a substantial fastening for the hoisting chain. The quadrants are also connected by diagonal braces 74.

The rear chute extension of the body portion consists of a frame 71$^a$ having lugs projecting therefrom and the sheet metal chute 71 is attached to these lugs by small transverse bolts. There is a lower projection 71$^b$ which extends under this sheet metal chute to take a part of the strain. The brace chains 67$^a$ for the chute 67 are attached to the lugs 71$^c$ on the frame and these chains support the outer end of the main chute 67 when the chute is located near the wagon.

The main gate, shown at 76, has a frame 76$^a$ secured thereto at three points; such frame having an offset guiding band 76$^b$ at the upper end and a bearing 76$^c$ at its lower end on which a link 77$^a$ is journaled; said link being inclosed by the guiding band 76$^b$ and connected at its upper end to an operating lever 77. The construction of the link 77$^a$ is clearly shown in Fig. 17, which also shows the manner in which it is held in position by a pivot bolt 78, which also passes through the gate 76 and the frame 76$^a$. By this construction the strain is taken off of the pivot bolt and the link has a projection 77$^b$ at the upper end which bears upon the gate. The main gate regulates the flow of material from the wagon and the laterally moving pivoted shutter 80, located beyond the gate, is for the purpose of controlling the flow of material from one side of the chute to the other.

I preferably make the quadrant in three pieces of wrought metal shaped as shown in Fig. 19, the section $a$ being a straight piece and perforated at each end, while the section $b$ is curved, and terminates in a bearing for the hoisting chain and the section $c$ is curved, as shown, and acts as a brace. The parts are welded at the points $x$, preferably by acetylene or electric welding, but they may be forge welded if desired, thus making an exceedingly substantial quadrant.

It will be seen by the above construction, that I am enabled to make a very substantial wagon in which wooden beams are preferably used. These wooden beams are connected by standards of metal formed in such a manner as to provide a rigid construction which will withstand the rough usage to which a wagon of this character is subjected.

There is a train of gears mounted on a separate frame, which is secured to the main frame so that the entire gear mechanism may be assembled separately, insuring more accurate workmanship. In the event of repairs being necessary the parts can be readily dismantled and re-applied.

When the body is in its normal position illustrated in Fig. 1, it can be loaded, and when it is desired to discharge the contents the body can be raised, as in Fig. 4. If the mechanism is mounted on a power driven truck, the power mechanism can be thrown in gear with the train of gears and the body raised and tilted by the quadrants 16, the chain, which is attached to the quadrants, being wrapped around the shaft 21, which acts as a drum. The body, if desired, can be tilted to any degree by adjusting the telescopic bar 26, after which the chute can be run out to any distance and the rear end of the chute can be lifted so as to come in close contact with the delivery spout of the body portion, and by raising the gate by the lever 77 the contents of the body portion will flow through the opening onto the chute to the discharge point.

I claim:

1. The combination in a dumping wagon, of a frame secured to the running gear of the wagon, said frame consisting of a pair of longitudinal sills at each side, one mounted above the other and spaced apart; a series of metal standards disposed between the sills; cross braces connecting the standards so as to form a rigid rectangular construction; a body portion resting upon the sills; quadrants pivoted to the said rear standards and connected to the body portion; and means for raising and lowering the body portion.

2. The combination of a frame consisting of a pair of sills at each side of the wagon spaced apart, metal standards disposed vertically between said sills, channeled transverse braces between said sills at the front and rear ends of the same, said standards and transverse braces being integral and including diagonal braces extending between the standards and the transverse braces, a body portion, and means for raising and lowering the body portion on the frame formed by the sills.

3. A bearing for a train of gears of the lifting mechanism of a dump wagon, said bearing consisting of a single casting having a main section and an overhanging section integrally secured to the main section at one end only, said overhanging section paralleling the main section, both sections having a series of bearings therein for the shafts of a train of gears, whereby the shafts are rigidly supported at each end.

4. The combination in a dump wagon, of a frame; a body portion; two quadrants located, one on each side of the wagon; means connected to the quadrants for raising the body portion; and an arched casting connecting the lower ends of the two quadrants, said casting being recessed for the reception of the end links of a chain by which the body portion is raised.

5. The combination in a dumping wagon, of a frame consisting of two sills at each side spaced apart; a body portion mounted above the frame; a standard at the rear end of each side frame; a brace beam connecting the standards, each standard having a bearing at its upper end; and quadrants connected to the bearings and to the body of the wagon.

6. The combination of a dump wagon, of a frame at each side of the wagon, consisting of sills; metallic standards connecting the sills, the front and rear standards having integral braces extending toward the center of the wagon; and beams secured to the braces and connecting the two side frames of the wagon.

7. The combination in a dumping wagon, of a frame; a body portion; means for raising and lowering the body portion; a bearing on the frame; a telescopic rod pivoted to the bearing; and a bearing on the body portion for the upper end of the telescopic rod, said latter bearing having a guide flange arranged to pass back of the top sill of the frame when the body portion is lowered.

8. The combination in a dumping wagon, of a frame; a body portion; quadrants thereon; bearings on the frame; a shaft mounted in the bearings; chains connecting the shaft with the quadrants; and means for operating the shaft, the bearings having wear flanges for engagement by the quadrants, said flanges also acting to strengthen the bearings.

LEONARD RODENHAUSEN.

Copies of this patent may be obtained for five cents each, by addressing the "Commissioner of Patents, Washington, D. C."